US 9,639,833 B2

(12) United States Patent
Konishi

(10) Patent No.: US 9,639,833 B2
(45) Date of Patent: May 2, 2017

(54) COMMODITY SALES DATA PROCESSING APPARATUS, PORTABLE TERMINAL AND METHOD

(71) Applicant: TOSHIBA TEC KABUSHIKI KAISHA, Shinagawa-ku, Tokyo (JP)

(72) Inventor: Shota Konishi, Tokyo-to (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 14/170,688

(22) Filed: Feb. 3, 2014

(65) Prior Publication Data

US 2014/0222598 A1   Aug. 7, 2014

(30) Foreign Application Priority Data

Feb. 4, 2013  (JP) .................................. 2013-019669
Oct. 29, 2013 (JP) .................................. 2013-224145

(51) Int. Cl.
*G06G 1/12* (2006.01)
*G06Q 20/20* (2012.01)
*G06Q 20/18* (2012.01)
*G06Q 20/32* (2012.01)
*G06Q 20/36* (2012.01)

(52) U.S. Cl.
CPC ........... *G06Q 20/202* (2013.01); *G06Q 20/18* (2013.01); *G06Q 20/204* (2013.01); *G06Q 20/208* (2013.01); *G06Q 20/3227* (2013.01); *G06Q 20/3278* (2013.01); *G06Q 20/3672* (2013.01)

(58) Field of Classification Search
None
See application file for complete search history.

(56) References Cited

U.S. PATENT DOCUMENTS

| 2001/0018666 A1* | 8/2001 | Sugiyama et al. .............. 705/14 |
| 2004/0173674 A1* | 9/2004 | Matsuura ...................... 235/380 |
| 2004/0186760 A1* | 9/2004 | Metzger .......................... 705/7 |

(Continued)

FOREIGN PATENT DOCUMENTS

| JP | 2003-228775 | 8/2003 |
| JP | 2004-265299 | 9/2004 |

(Continued)

OTHER PUBLICATIONS

Japanese Office Action for Japanese Patent Application No. 2013-224145 mailed on Sep. 27, 2016.

*Primary Examiner* — Fateh M Obaid
(74) *Attorney, Agent, or Firm* — Amin, Turocy & Watson LLP

(57) ABSTRACT

A commodity sales data processing apparatus comprises a wireless communication section; an input section configured to input commodity specification information specifying a commodity; a determination unit configured to determine whether or not wireless communication with a portable terminal of a customer is established; and a communication unit configured to wirelessly transmit information for the display of settlement information based on the commodity specification information input from the input section on the portable terminal from the wireless communication section to the portable terminal on condition that the determination unit determines that wireless communication with the portable terminal is established.

7 Claims, 10 Drawing Sheets

(56) References Cited

U.S. PATENT DOCUMENTS

| | | |
|---|---|---|
| 2009/0166414 A1* | 7/2009 | Mori et al. .................... 235/383 |
| 2011/0184798 A1* | 7/2011 | Wang et al. ................ 705/14.38 |
| 2014/0236760 A1* | 8/2014 | Ishikawa et al. ............ 705/26.8 |

FOREIGN PATENT DOCUMENTS

| | | |
|---|---|---|
| JP | 2008-083943 | 4/2008 |
| JP | 2011-039739 | 2/2011 |

\* cited by examiner

COMMODITY SALES DATA PROCESSING APPARATUS, PORTABLE TERMINAL AND METHOD

CROSS-REFERENCE TO RELATED APPLICATION

The present application is based upon and claims the benefit of priorities from Japanese Patent Application No. 2013-019669 filed on Feb. 4, 2013 and Japanese Patent Application No. 2013-224145 filed on Oct. 29, 2013, the entire contents of which are hereby incorporated by reference.

FIELD

Embodiments described herein relate to a commodity sales data processing apparatus, a portable terminal and a method.

BACKGROUND

In a supermarket or department store, the purchased commodities are registered and settled using a commodity sales data processing apparatus, such as a POS (Point of Sales) terminal or a register, which comprises an optical reader. To register a commodity using the commodity sales data processing apparatus, the optical reader is used to read a commodity code such as a barcode or a two-dimensional code attached to the commodity, and the commodity sales data processing apparatus executes a commodity registration based on the read commodity code. The commodity sales data processing apparatus prints commodity information or settlement information serving as a result of the commodity registration on a receipt paper and then issues the receipt. The customer takes the issued receipt to keep an account of household expense with the receipt information such as the commodity information or the checkout information printed on the receipt.

However, with the popularization of a portable terminal such as a mobile phone, a smart phone or a tablet PC, customers hope to use a portable terminal to receive and display settlement information.

BRIEF DESCRIPTION OF THE DRAWINGS

FIG. 7-1 is a flowchart illustrating the flow of a control processing carried out by a POS terminal and a portable terminal;

FIG. 7-2 is a flowchart illustrating the flow of a control processing carried out by a POS terminal and a portable terminal;

FIG. 7-3 is a flowchart illustrating the flow of a control processing carried out by a POS terminal and a portable terminal;

DETAILED DESCRIPTION

In accordance with an embodiment, a commodity sales data processing apparatus comprises a wireless communication section; an input section configured to input commodity specification information specifying a commodity; a determination unit configured to determine whether or not wireless communication with a portable terminal of a customer is established; and a communication unit configured to wirelessly transmit information for the display of settlement information based on the commodity specification information input from the input section on the portable terminal from the wireless communication section to the portable terminal on condition that the determination unit determines that wireless communication with the portable terminal is established.

In accordance with an embodiment, a portable terminal comprises a wireless communication section; a settlement processing unit configured to execute, if commodity information containing the price of a commodity is received from a commodity sales data processing apparatus through the wireless communication section, a settlement processing based on commodity information; and a settlement information sending unit configured to send settlement information resulting from the settlement processing executed by the settlement processing unit to the commodity sales data processing apparatus.

In accordance with an embodiment, a method includes determining whether or not wireless communication with a portable terminal of a customer is established; and wirelessly transmitting information for the display of settlement information based on commodity specification information input from an input section on the portable terminal from a wireless communication section to the portable terminal on condition that the wireless communication with the portable terminal is determined to be established.

The commodity sales data processing apparatus, the portable terminal and the method according to a first embodiment are described in detail below with reference to FIG. 1 to FIG. 8. The commodity sales data processing apparatus is, for example, a POS terminal or a register. In the first embodiment, a POS terminal is described as an example of the commodity sales data processing apparatus. Additionally, the present invention is not limited to the first embodiment which will be described below.

Figure 1:
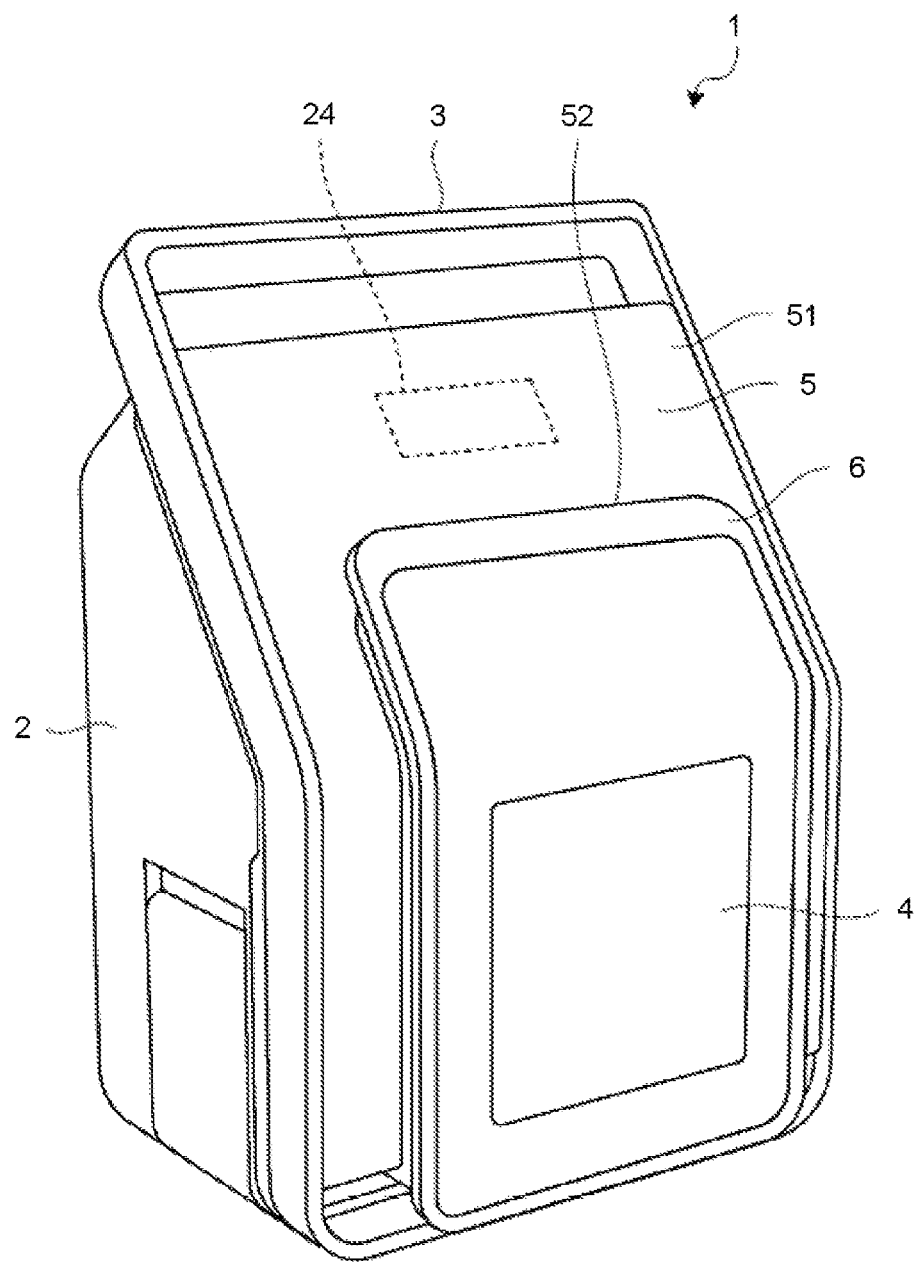
FIG. 1 is a perspective view of a POS terminal according to a first embodiment.
Figure 2:
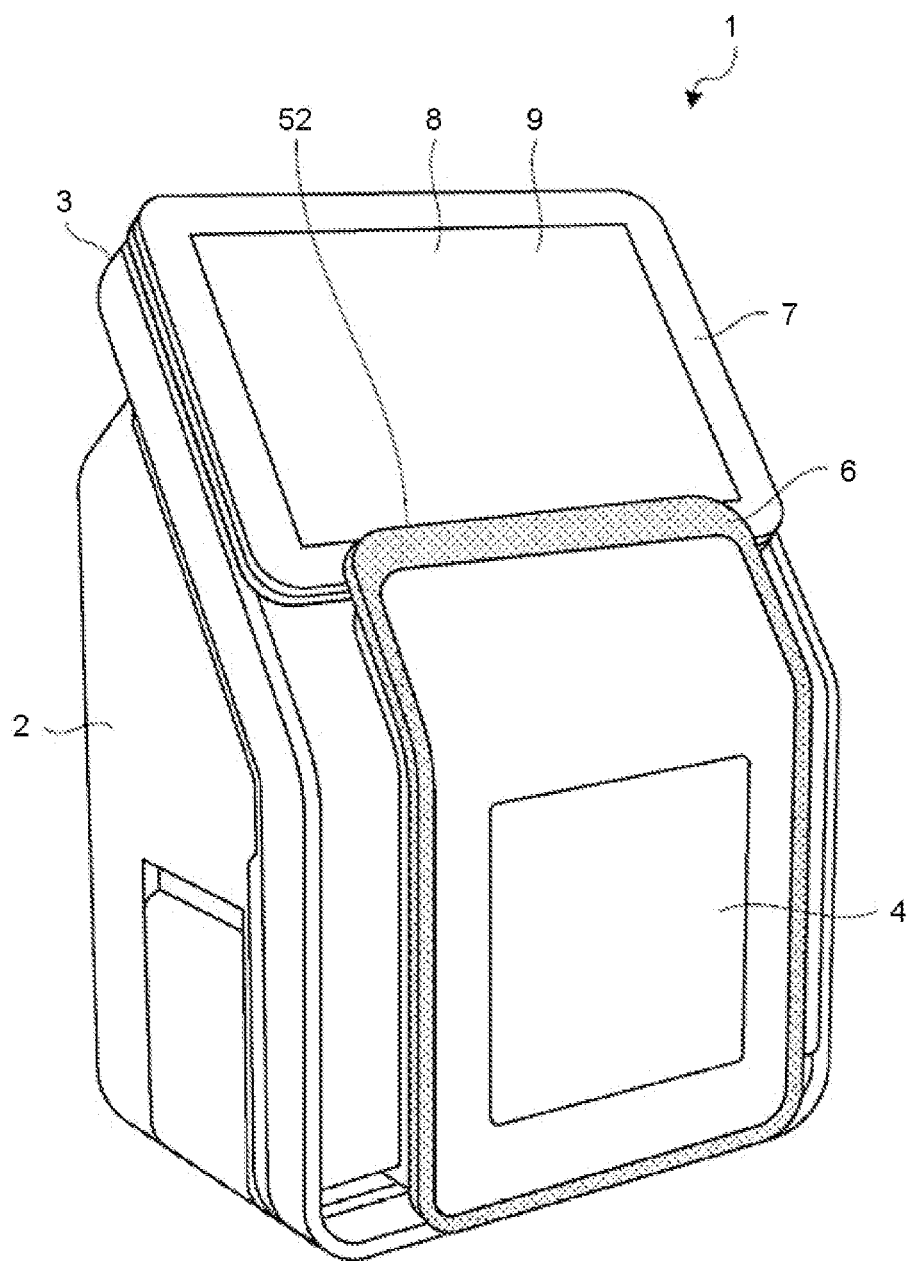
FIG. 2 is a perspective view of a POS terminal on which a portable terminal is held.

FIG. 1 is a perspective view of a POS terminal 1 according to the first embodiment. FIG. 2 is a perspective view of a POS terminal 1 on a portable terminal holding section 5 of which a portable terminal 7 is held. As shown in FIG. 1 and FIG. 2, the POS terminal 1 is arranged in a store, and the portable terminal 7 is detachably held on the portable terminal holding section 5 of the POS terminal 1. The POS terminal 1 registers the commodities purchased by a customer to update sales information of the commodities and settles the amount paid by the customer. In the first embodiment, the POS terminal 1 is described as a self-type POS terminal which is operated by the customer. Additionally, the POS terminal 1 may also be a POS terminal which is operated by an operator.

In FIG. 1 and FIG. 2, the POS terminal 1 comprises a main body 2, a handle 3, a code reader 4 serving as an input section for inputting a commodity code for specifying a commodity, a portable terminal holding section 5 and a light-emitting section 6. The lower portion of the main body 2 is substantially formed in a rectangular parallelepiped shape. The code reader 4 having a reading window on a vertical side of the main body 2 is arranged inside the rectangular parallelepiped shaped portion of the main body 2. An inclined portion 51 inclined from the front side to the back side of the main body 2 is formed on the main body 2 at a position upper than the code reader 4. The portable terminal holding section 5 is arranged on the main body 2 along the inclined portion 51. On the main body 2, the handle 3 is formed at the upper side of the portable terminal holding section 5 along the inclined portion 51.

A circuit board or a power supply for the POS terminal 1 is arranged inside the main body 2. The handle 3 is used to carry the POS terminal 1. The code reader 4 has a CCD (Charge Coupled Device) image sensor which is arranged in the main body 2. The code reader 4 reads a commodity code from a code symbol such as a barcode or a two-dimensional code attached to a commodity. The code reader 4 reads the image of a commodity using the image sensor, recognizes a commodity code from the code symbol contained in the image, and inputs the commodity code. Further, the code reader 4 may also be various other readers, such as a reader which optically reads a commodity code by irradiating a laser light and then receiving the reflection light reflected from the code of a commodity, a reader which reads a commodity code from a captured image, and the like. Further, it is not limited to the code recognition, object recognition for recognizing an object based on the feature amount of the object may also be used.

The portable terminal 7 may be any portable PC such as a portable phone, a smart phone or a tablet PC. In the first embodiment, a tablet PC is described as an example of the portable terminal 7. The portable terminal holding section 5 comprises a flat inclined portion 51 which is formed on the upper portion of the main body 2 and a support portion 52 which is arranged at the lower end of the inclined portion 51 to face the inclined portion 51 at a distance substantially equivalent to the thickness of the portable terminal 7. The POS terminal 1 carries the portable terminal 7 with the inclined portion 51 while supporting the portable terminal 7 with the lower end of the inclined portion 51 and the support portion 52, thereby holding the portable terminal 7.

A NFC (Near Field Communication) device 24 serving as the wireless communication section for carrying out near-distance wireless communication is arranged inside the main body 2 of the POS terminal 1 at a position nearby the center of the inclined portion 51. The NFC device 24 is located at such a position where when the portable terminal 7 is held on the POS terminal 1, the NFC device 24 is nearby and opposite to a NFC device 37 arranged in the portable terminal 7. In this state, the POS terminal 1 and the portable terminal 7 communicate with each other through NFC devices thereof.

The NFC device 24 executes near-distance wireless communication. The communication distance of the NFC device 24 is from several centimeters to dozens of centimeters. The NFC device 24 establishes communication with the portable terminal 7 held on the portable terminal holding section 5 and exchanges information between the POS terminal 1 and the portable terminal 7.

The light-emitting section 6 is formed around the code reader 4 in an annular shape. The light-emitting section 6 is formed by a transparent acrylic plate, and the whole annular acrylic plate emits light when the light source (not shown) arranged in the main body 2 emits light. The light-emitting section 6 emits blue light when the POS terminal 1 is in a standby state, yellow light during a commodity registration process, and red light if a settlement is not ended smoothly or the apparatus is in abnormality state.

The portable terminal 7 comprises a display section 8 for displaying various keys or information and an operation section 9 consisting of a touch panel arranged on the display section 8. The display section 8 faces diagonally upward when the portable terminal 7 is held on the portable terminal holding section 5. The customer operates the operation section 9 with fingers based on the keys or information displayed on the display section 8.

Figure 3:
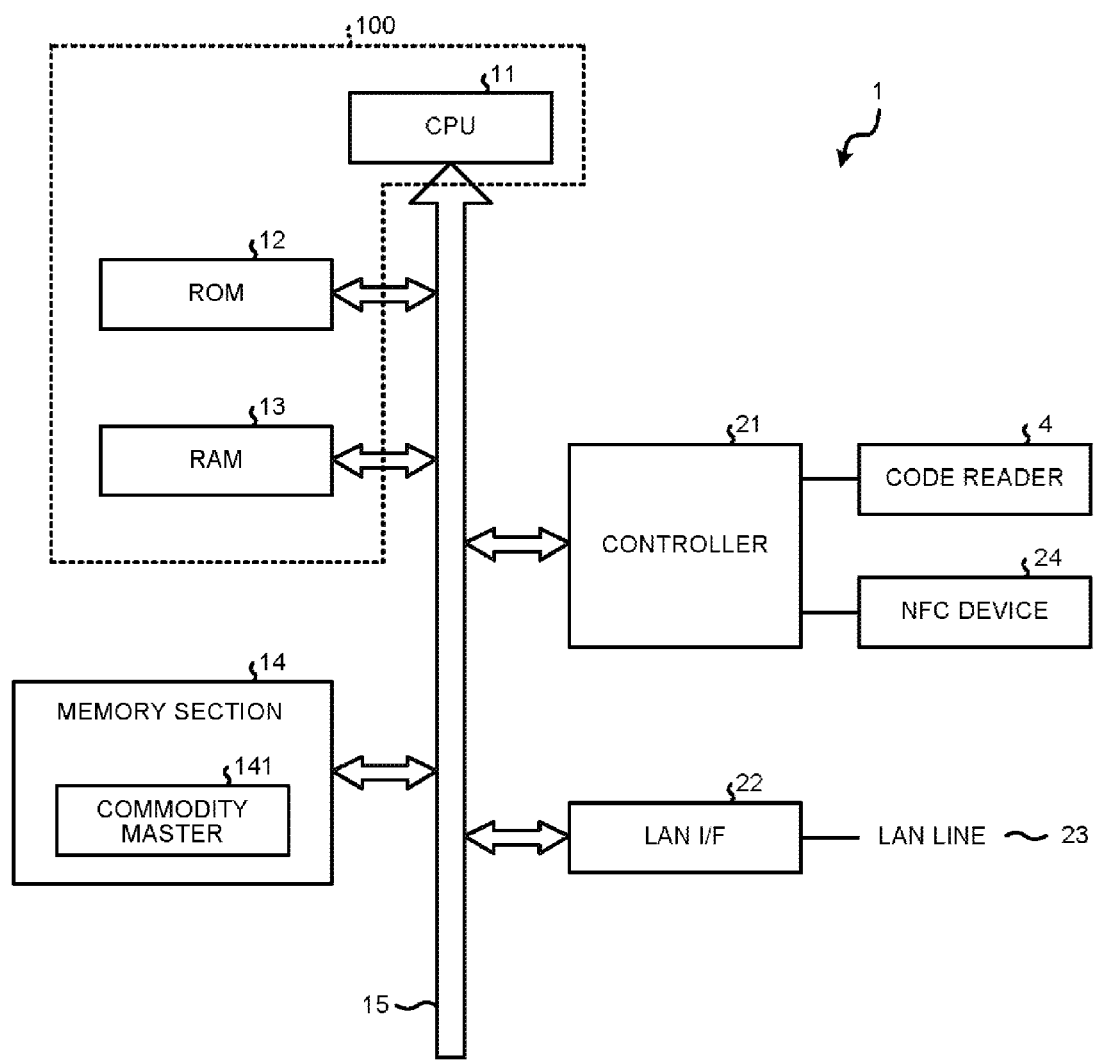
FIG. 3 is a block diagram illustrating the hardware arrangement of a POS terminal.

FIG. 3 is a block diagram illustrating the hardware arrangement of the POS terminal 1 according to the first embodiment. In FIG. 3, the POS terminal 1 comprises a CPU (Central Processing Unit) 11 constituting a control main body, a ROM (Read Only Memory) 12 for storing various programs, a RAM (Random Access Memory) 13 functioning as the working area of the CPU 11 and serving as a storage unit and a memory section 14 consisting of a HDD for storing various programs. The memory section 14 stores application software sent from the POS terminal 1 to the portable terminal 7. When installed and started in the portable terminal 7, the application software executes information transmission and reception with the POS terminal 1 in the potable terminal 7. The CPU 11, the ROM 12, the RAM 13 and the memory section 14 are connected with each other through a data bus line 15.

The CPU 11, the ROM 12, the RAM 13 and the memory section 14 constitute a control section 100, which executes a control processing which will be described later by enabling the CPU 11 to operate according to a program stored in the ROM 12 or the memory section 14 and expanded in the RAM 13.

Further, the data bus line 15 is connected with the code reader 4 and the NFC device 24 through a controller 21.

The memory section 14, which is a nonvolatile storage device such as a HDD (Hard Disk Drive) or a flash memory, stores a control program for controlling the POS terminal 1 or a commodity master 141 for storing the commodity information (commodity name, commodity price and the like) corresponding to a commodity code specifying a commodity.

Further, the data bus line 15 is connected with a LAN line 23 via a LAN I/F (Interface) 22 and another POS terminal 1 or an upper device via the LAN line 23.

Figure 4:
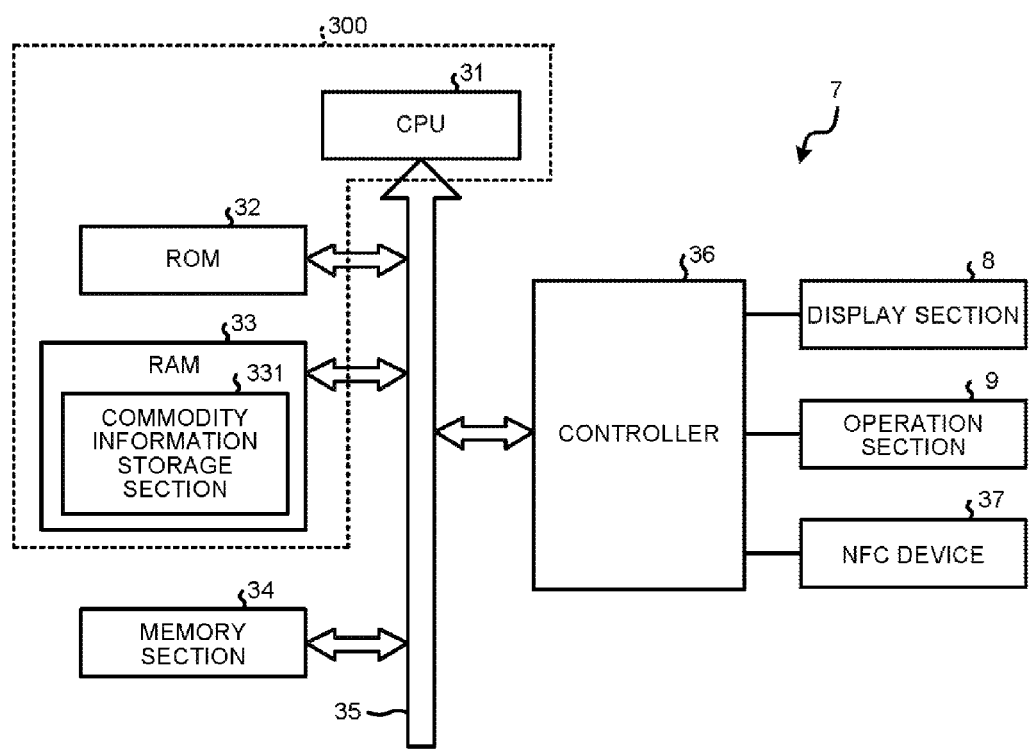
FIG. 4 is a block diagram illustrating the hardware arrangement of a portable terminal.

FIG. 4 is a block diagram illustrating the hardware arrangement of the portable terminal 7. In FIG. 4, the portable terminal 7 comprises a CPU 31 constituting a control main body, a ROM 32 for storing various programs, a RAM 33 functioning as the working area of the CPU 31 and a memory section 34 consisting of a HDD for storing various programs. The CPU 31, the ROM 32, the RAM 33 and the memory section 34 are connected with each other through a data bus line 35.

The CPU 31, the ROM 32, the RAM 33 and the memory section 34 constitute a control section 300, which executes a control processing which will be described later by enabling the CPU 31 to operate according to a control program stored in the ROM 32 or the memory section 34 and expanded in the RAM 33. Further, the commodity code is read by the POS terminal 1, and the RAM 33 has a commodity information storage section 331 which stores the commodity information sent from the POS terminal 1. The memory section 34, which is a nonvolatile storage device such as a flash memory, stores a control program for controlling the portable terminal 7.

Further, the data bus line 35 is connected with the display section 8 and the operation section 9 via a controller 36. The data bus line 35 is further connected with a NFC device 37 serving as the wireless communication section through the controller 36. The NFC device 37 has the same function with the aforementioned NFC device 24.

Figure 5:
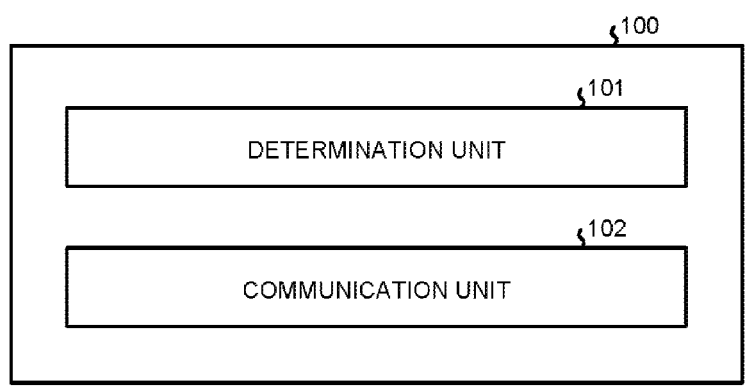
FIG. 5 is a functional block diagram illustrating the functional components of a POS terminal.

FIG. 5 is a functional block diagram illustrating the functional components of the POS terminal 1. The POS terminal 1 realizes a determination unit 101 and a communication unit 102 by enabling the control section 100 to operate according to various programs stored in the ROM 12 or the memory section 14.

The determination unit 101 has a function of determining whether or not wireless communication with the portable terminal 7 of a customer is established.

The communication unit 102 wirelessly transmits information for the display of settlement information based on the commodity code input from the input section on the portable terminal 7 from the wireless communication section to the portable terminal 7 on condition that the determination unit 101 determines that wireless communication with the portable terminal 7 is established.

Figure 6:
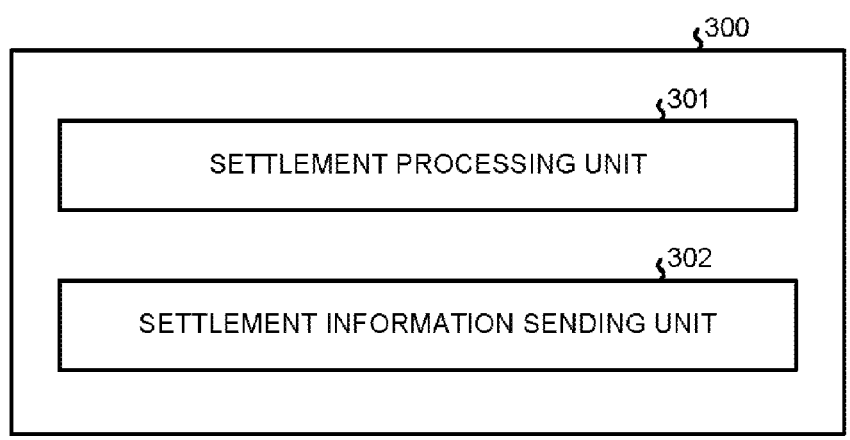
FIG. 6 is a functional block diagram illustrating the functional components of a portable terminal.

FIG. 6 is a functional block diagram illustrating the functional components of the portable terminal 7, the portable terminal 7 realizes a settlement processing unit 301 and a settlement information sending unit 302 by enabling the control section 300 to operate according to various programs stored in the ROM 32 or the memory section 34.

The settlement processing unit 301 executes, if commodity information containing the price of a commodity is received from the POS terminal 1 through the wireless communication section, a settlement processing based on commodity information.

The settlement information sending unit 302 sends the settlement information resulting from the settlement processing executed by the settlement processing unit 301 to the POS terminal 1.

FIG. 7-1, FIG. 7-2 and FIG. 7-3 are flowcharts illustrating the flow of a control processing carried out by the POS terminal 1 and the portable terminal 7. In FIG. 7-1, FIG. 7-2 and FIG. 7-3, the control section 100 (determination unit 101) of the POS terminal 1 determines whether or not the portable terminal 7 is recognized (ACT SP11). When the portable terminal 7 is held on the portable terminal holding section 5, the control section 100 communicates with the NFC device 37 of the portable terminal 7 via the NFC device 24 and recognizes the portable terminal 7, thereby establishing wireless communication between the POS terminal 1 and the portable terminal 7. If it is determined that the portable terminal 7 is recognized (YES in ACT SP11), the control section 100 sends a signal indicative of the recognition on the portable terminal 7 to the portable terminal 7 via the NFC device 24 (ACT SP12).

The control section 300 of the portable terminal 7 determines whether or not the signal indicative of the recognition is received from the POS terminal 1 (ACT SP51). If the signal is not received (NO in ACT SP51), the control section 300 executes ACT SP60. If it is determined that the signal is received (YES in ACT SP51), the control section 300 displays, on the display section 8, a selection screen on which 'whether or not to receive application software from the POS terminal 1' is displayed (ACT SP52). The application software, which is stored in the memory section 14, is software for the display of a menu screen which will be described later with reference to FIG. 8 on the display section 8 of the portable terminal 7. Further, the application software is software for acquiring various kinds of information from the POS terminal 1. Moreover, the application software is also software for the operator to output a settlement instruction to the POS terminal 1.

Further, if the control section 100 determines that the portable terminal 7 is not recognized (NO in ACT SP11), the control section 100 executes a normal processing without using the portable terminal 7 (ACT SP18).

The customer views the display screen of the display section 8 to determine whether or not to receive the application software. The control section 300 determines whether or not 'receive the application software' is selected (ACT SP53). If it is determined that 'not receive the application software' is selected (NO in ACT SP53), the control section 300 executes ACT SP60. If it is determined that 'receive the application software' is selected (YES in ACT SP53), the control section 300 sends a signal indicative of the need of the application software and the customer code of the customer stored in the portable terminal 7 from the NFC device 37 to the POS terminal 1 through the NFC device 24 (ACT SP54).

The control section 100 of the POS terminal 1 determines whether or not the signal indicative of the need of the application software is received from the portable terminal 7 (ACT SP13). If it is determined that the signal indicative of the need of the application software is not received (NO in ACT SP13), the control section 100 executes ACT SP21. If it is determined that the signal indicative of the need of the application software is received (YES in ACT SP13), the control section 100 executes an authentication processing of the customer code of the customer received from the portable terminal 7 (ACT SP14). As to the authentication processing, if a customer can be specified by confirming the existence of a customer code based on the customer information stored in an upper device (not shown), then the customer can be authenticated. If it is determined that the customer is authenticated (YES in ACT SP15), the control section 100 (sending unit 103) sends the application software to the portable terminal 7 (ACT SP16). If it is determined that the customer is not authenticated (NO in ACT SP15), the control section 100 sends a signal indicative of a rejected authentication to the portable terminal 7 (ACT SP17).

The control section 300 of the portable terminal 7 determines whether or not the application software is received from the POS terminal 1 (ACT SP55). If it is determined that the application software is received (YES in ACT SP55), the control section 300 installs the received application software in the RAM 33 of the portable terminal 7 (ACT SP56). Then, the control section 300 determines whether or not the installation of the application software is completed (ACT SP57). The control section 300 waits until the installation is completed (NO in ACT SP57), and if it is determined that the installation is completed (YES in ACT SP57), the control section 300 sends a signal indicative of the completion of the installation to the POS terminal 1 (ACT SP58). Then, the control section 300 starts the application software, and displays the menu screen shown in FIG. 8 on the display section 8 (ACT SP59).

Further, if the control section 300 determines that the application is not received (NO in ACT SP55), then the control section 300 determines whether or not a rejection signal is received (ACT SP98). After determining no rejection signal is received (NO in ACT SP98), the control section 300 waits to receive the application software. After determining a rejection signal is received (YES in ACT SP98), the control section 300 proceeds to ACT SP60.

Figure 8:
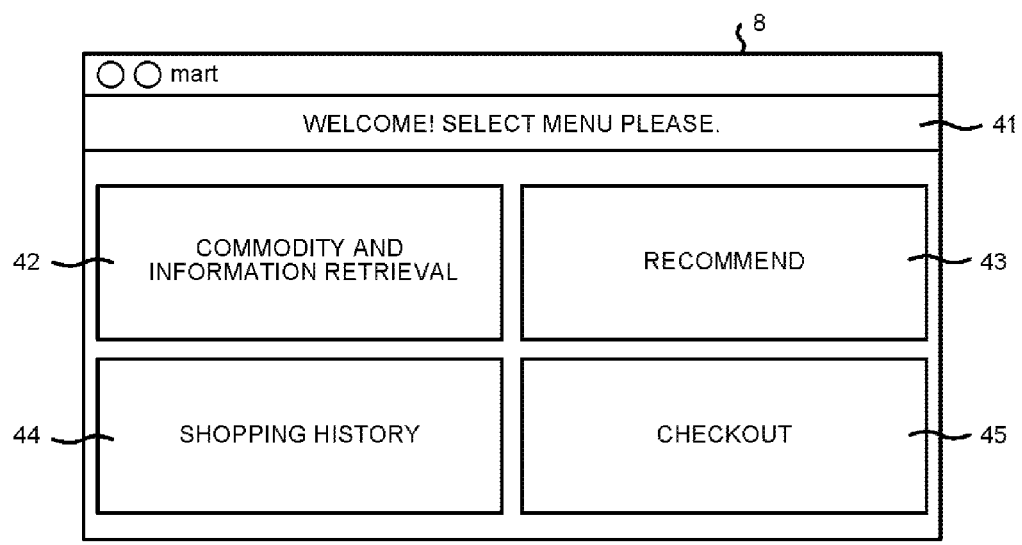
FIG. 8 is a diagram illustrating a menu screen of a portable terminal.

FIG. 8 is a diagram illustrating the menu screen of the portable terminal 7. In FIG. 8, the display section 8 of the portable terminal 7 displays a message 41 for a customer. Further, the display section 8 displays a commodity and information retrieval key 42, a recommend key 43, a shopping history key 44 and a checkout key 45.

When the commodity and information retrieval key 42 is operated, traceability information specifying the manufacturer or distribution channel of a selected commodity and recipe information of the selected commodity are displayed. When the recommend key 43 is operated, information introducing recommended commodities of the store is displayed with reference to the shopping history of the customer specified by the customer code. When the shopping history key 44 is operated, the shopping history of the customer specified by the customer code is displayed. When the checkout key 45 is operated, a commodity registration can be carried out for an authenticated customer.

The control section 300 of the portable terminal 7 determines whether or not the checkout key 45 is operated (ACT SP60). If the checkout key 45 is operated (YES in ACT SP60), the control section 300 sends a signal indicating that the checkout key 45 is operated to the POS terminal 1 (ACT SP61). Then, the control section 300 executes the processing in ACT SP71. If it is determined that the checkout key 45 is not operated (NO in ACT SP60), the control section 300 sequentially determines whether or not the commodity and information retrieval key 42 is operated (ACT SP62). If it is determined that the commodity and information retrieval key 42 is operated (YES in ACT SP62), the control section 300 sends a signal indicating that the commodity and information retrieval key 42 is operated to the POS terminal 1 (ACT SP63). Then, the control section 300 executes the processing in ACT SP71.

If it is determined that the commodity and information retrieval key 42 is not operated (NO in ACT SP62), the control section 300 sequentially determines whether or not the recommend key 43 is operated (ACT SP64). If it is determined the recommend key 43 is operated (YES in ACT SP64), the control section 300 sends a signal indicating that the recommend key 43 is operated to the POS terminal 1 (ACT SP65). Then, the control section 300 executes the processing in ACT SP71. If it is determined that the recommend key 43 is not operated (NO in ACT SP64), the control section 300 sequentially determines whether or not the shopping history key 44 is operated (ACT SP66). If it is determined the shopping history key 44 is operated (YES in ACT SP66), the control section 300 sends a signal indicating that the shopping history key 44 is operated to the POS terminal 1 (ACT SP67). If it is determined that the shopping history key 44 is not operated (NO in ACT SP66), the control section 300 proceeds to ACT SP68.

The control section 100 (determination unit 101) of the POS terminal 1 determines whether or not the signal indicative of the completion of the installation of the application software sent in ACT SP58 is received from the control section 300 of the portable terminal 7 (ACT SP21). If it is determined that the signal is received (YES in ACT SP21), it is determined whether or not the signal sent in ACT SP61 indicating that the closing key 45 is operated is received from the control section 300 of the portable terminal 7 (ACT SP22). If it is determined that the signal indicating that the checkout key 45 is operated is received (YES in ACT SP22), then the control section 100 enables the code reader 4 to be capable of reading a code (ACT SP23). Next, a signal instructing to display the information indicating that the code can be read is sent to the portable terminal 7 (ACT SP24). Then, it is determined that whether or not a commodity code is input by reading the code attached to a commodity (ACT SP25). If it is determined that a commodity code is input (YES in ACT SP25), the control section 100 (storage unit 104) acquires the commodity information (commodity price and commodity name and the like) corresponding to the commodity code from the commodity master 141 stored in the memory section 14 and stores the acquired commodity information and the commodity code in the RAM 13 (ACT SP26). Then, the control section 100 (communication unit 102) sends all the stored commodity information to the portable terminal 7 (ACT SP27). Further, if it is determined that no commodity code is input (NO in ACT SP25), the control section 100 executes the processing in ACT SP28.

The control section 300 determines whether or not the commodity information sent in ACT SP27 is received (ACT SP68). If it is determined that the commodity information is received (YES in ACT SP68), the control section 300 stores the received commodity information in the commodity information storage section 331 of the RAM 33 (ACT SP69). Then, the stored commodity information is displayed on the display section 8 (ACT SP70). Then, the control section 300 executes the processing in ACT SP71. If it is determined that no commodity information is received (NO in ACT SP68), the control section 300 proceeds to the processing in ACT SP71.

Further, in the POS terminal 1, the light-emitting section 6 which emits blue light in a standby state emits yellow light during a commodity registration process. Moreover, the control section 100 determines whether or not a signal indicating that the end key (not shown) is operated is received from the portable terminal 7 (ACT SP28). If it is determined that the signal is received (YES in ACT SP28), the control section 100 (communication unit 102) sends the settlement information obtained according to the stored commodity information and the total amount of commodities to the portable terminal 7 (ACT SP81). If it is determined that the signal is not received (NO in ACT SP28), the control section 100 returns to ACT SP25 to wait for the input of a next commodity code. The settlement information refers to receipt information containing names, amount and the total amount of the purchased commodities based on commodity information and total amount information.

Further, if it is determined that the checkout key 45 is not operated (NO in ACT SP22), the control section 100 determines whether or not the signal sent in ACT SP63 and indicating that the commodity and information retrieval key 42 is operated is received (ACT SP31). If it is determined that the commodity and information retrieval key 42 is operated (YES in ACT SP31), the control section 100 determines whether or not a commodity code is input (ACT SP32). The control section 100 waits until a commodity code is input (NO in ACT SP32), and if it is determined that a commodity code is input (YES in ACT SP32), the control section 100 acquires, from an upper device, recipe information or traceability information of the commodity represented by the commodity code and sends the acquired information to the portable terminal 7 (ACT SP33).

Further, if it is determined that the commodity and information retrieval key 42 is not operated (NO in ACT SP31), the control section 100 determines whether or not the signal sent in ACT SP65 and indicating that the recommend key 43 is operated is received (ACT SP34). If it is determined that the signal is received (YES in ACT SP34), the control section 100 acquires, from an upper device, recommended commodity information corresponding to the customer represented by the customer code and sends the acquired information to the portable terminal 7 (ACT SP35).

Further, if it is determined that the recommend key 43 is not operated (NO in ACT SP34), the control section 100 determines whether or not the signal sent in ACT SP67 and indicating that the shopping history key 44 is operated is received (ACT SP36). If it is determined that the signal is received (YES in ACT SP36), the control section 100 acquires, from an upper device, shopping history information of the customer represented by the customer code and sends the acquired information to the portable terminal 7 (ACT SP37). If it is determined the signal is not received (NO in ACT SP36), the flow returns to ACT SP22.

On the other hand, if the control section 100 determines that the signal indicative of the completion of the installation of the application software is not received (NO in ACT SP21), the control section 100 determines whether or not a commodity code is input in this state (ACT SP41). If it is determined that a commodity code is input (YES in ACT SP41), as the installation of the application software is not completed, the control section 100 sends the information indicating that the code cannot be read to the portable terminal 7 (ACT SP42). If no commodity code is input (NO in ACT SP41), the control section 100 proceeds to the processing in ACT SP81.

Sequentially, the control section 300 of the portable terminal 7 determines whether or not the settlement information based on the processing in ACT SP81 is received (ACT SP71), determines whether or not recipe information or traceability information is received (ACT SP91), determines whether or not recommended commodity information is received (ACT SP93), and determines whether or not shopping history information is received (ACT SP95).

If it is determined that the settlement information is received (YES in ACT SP71), the control section 300 stores the received commodity information and settlement information in the RAM 33 (ACT SP72). Then, the control section 300 displays the stored commodity information and settlement information on the display section 8 (ACT SP73). In the first embodiment, the receipt information, including commodity names, prices and the total amount of the purchased commodities, is displayed. The customer determines whether or not to settle the content based on the displayed settlement information and operates the settlement key (not shown) displayed on the display section 8 after determining to settle the content. The control section 300 determines whether or not the settlement key is operated (ACT SP74). The control section 300 waits until the settlement key is operated (NO in ACT SP74), and the control section 300 sends settlement information to the FOS terminal 1 (ACT SP75) if it is determined that the settlement key is operated (YES in ACT SP74).

The control section 100 of the POS terminal 1 determines whether or not the settlement information is received from the portable terminal 7 (ACT SP82). If it is determined that settlement information is received (YES in ACT SP82), the control section 100 executes a settlement processing in the POS terminal 1 (ACT SP83). Then, the control section 100 sends a signal indicating that a settlement processing is carried out to the portable terminal 7 (ACT SP84). If it is determined that no settlement information is received (NO in ACT SP82), the control section 100 proceeds to ACT SP85.

The control section 300 of the portable terminal 7 determines whether or not a signal indicative of a settlement processing is received from the POS terminal 1 (ACT SP76). The control section 300 waits until a signal indicative of a settlement processing is received (NO in ACT SP76), and the control section 300 executes a settlement processing based on the electronic money information stored in the RAM 33 of the portable terminal 7 (ACT SP77) if it is determined that a signal indicative of a settlement processing is received (YES in ACT SP76). Sequentially, the control section 300 sends a signal indicative of the completion of the settlement processing to the POS terminal 1 when the settlement processing is ended (ACT SP78). Then, the control section 300 ends the processing.

The control section 100 of the POS terminal 1 determines whether or not the signal indicative of the completion of the settlement processing is received (ACT SP85). If it is determined the signal is received (YES in ACT SP85), the control section 100 ends the settlement processing carried out in the POS terminal 1 (ACT SP86). Then, the settlement completion information is sent to an upper device. If it is determined that no signal indicative of the completion of the settlement processing is received (NO in ACT SP85), the control section 100 ends the processing.

When all settlement processing is ended, the control section 100 changes the color of the light emitted from the light-emitting section 6 from yellow to blue. Additionally, the control section 100 executes an error processing and makes the light-emitting section 6 emit red light if a settlement processing is not ended smoothly, or the portable terminal 7 is taken down before a settlement processing is completed, or it is determined that another improper processing is being carried out.

Further, if the control section 300 of the portable terminal 7 determines that no commodity information and settlement information is received (NO in ACT SP71), the control section 300 determines whether or not the recipe information or traceability information sent in ACT SP33 is received (ACT SP91). If it is determined that the recipe information or traceability information is received (YES in ACT SP91), the control section 300 displays the received recipe information or traceability information on the display section 8 (ACT SP92).

If it is determined that no recipe information is received (NO in ACT SP91), the control section 300 sequentially determines whether or not the recommended commodity information sent in ACT SP35 is received (ACT SP93). If it is determined that the recommended commodity information is received (YES in ACT SP93), the control section 300 displays the received recommended commodity information on the display section 8 (ACT SP94).

If it is determined that no recommended commodity information is received (NO in ACT SP93), the control section 300 sequentially determines whether or not the shopping history information sent in ACT SP37 is received (ACT SP95). If it is determined that the shopping history information is received (YES in ACT SP95), the control section 300 displays the received shopping history information on the display section 8 (ACT SP96).

If it is determined that no shopping history information is received (NO in ACT SP95), the flow returns to ACT SP71.

Furthermore, in the first embodiment, if no customer code is received, the POS terminal 1 sends no software relating to checkout, recommendation or shopping history when the application is sent in ACT SP16. Thus, when a menu is displayed in the portable terminal 7 in ACT SP59, the recommend key 43, the shopping history key 44 and the checkout key 45 are grayed out and cannot be operated.

Thus, a nonmember customer assigned with no customer code can only operate the commodity and information retrieval key 42.

Further, the application software received in ACT SP55 and installed in ACT SP56 is started only when the portable terminal 7 is within the range of the NFC device 24 and is not started if the portable terminal 7 is out of the range of the NFC device 24. Thus, the portable terminal 7 is set within the range of the NFC device 24 so that various kinds of information provided to the portable terminal 7 can be acquired or a commodity registration processing using the portable terminal 7 can be carried out.

However, the commodity information and settlement information received in ACT SP71, the recipe information or traceability information received in ACT SP91, the recommended commodity information received in ACT SP93 and the shopping history information received in ACT SP95, once received, can be displayed on the display section 8 again even if the portable terminal 7 is out of the range of the NFC device 24.

Thus, according to the first embodiment, as commodity information or settlement information is sent from the POS terminal 1 to the portable terminal 7, commodity information can be acquired with the portable terminal 7.

Further, in the first embodiment, as commodity information is stored in the RAM 13 only when it is determined that the wireless communication with the portable terminal 7 is established, only a member carrying the portable terminal 7 can carry out a commodity registration processing.

Further, in the first embodiment, the portable terminal 7 is detachably held.

Further, in the first embodiment, as application software is sent which enables the sending of settlement information to the portable terminal 7 if the existence of the portable terminal 7 is recognized, the application software can be automatically sent to the portable terminal 7.

Further, in the first embodiment, as receipt information of the purchased commodities is sent to the portable terminal 7, receipt information can be acquired with the portable terminal 7. Moreover, the acquired receipt information can be displayed on the portable terminal 7.

Figure 9:
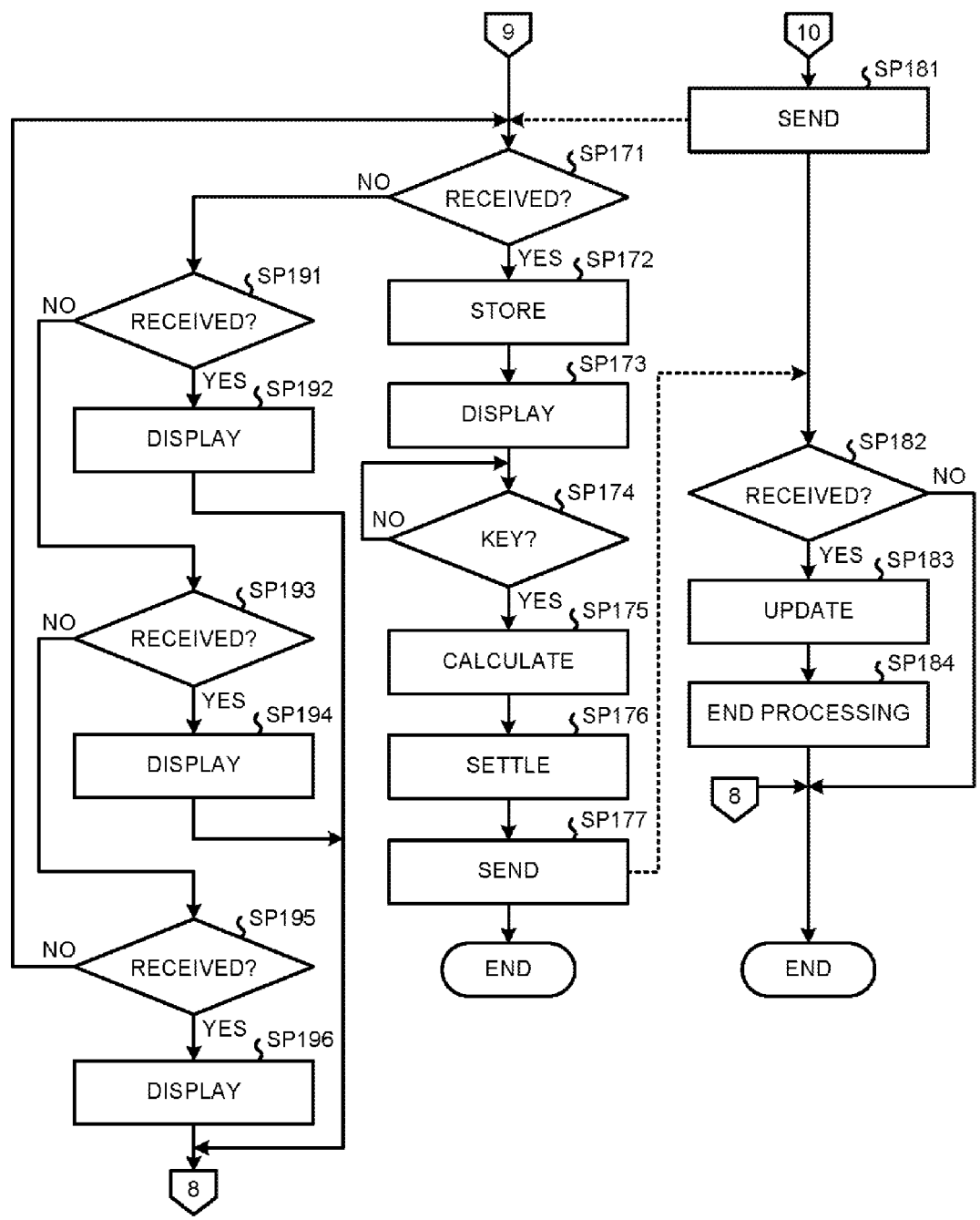
FIG. 9 is a flowchart illustrating the flow of a control processing carried out by a POS terminal and a portable terminal according to a second embodiment.

The commodity sales data processing apparatus, the portable terminal and the program according to a second embodiment are described in detail below with reference to FIG. 9. The commodity sales data processing apparatus is, for example, a POS terminal or a register. In the second embodiment, a POS terminal is described as an example of the commodity sales data processing apparatus. Additionally, the present invention is not limited to the second embodiment which will be described below.

Figures 1, 7:
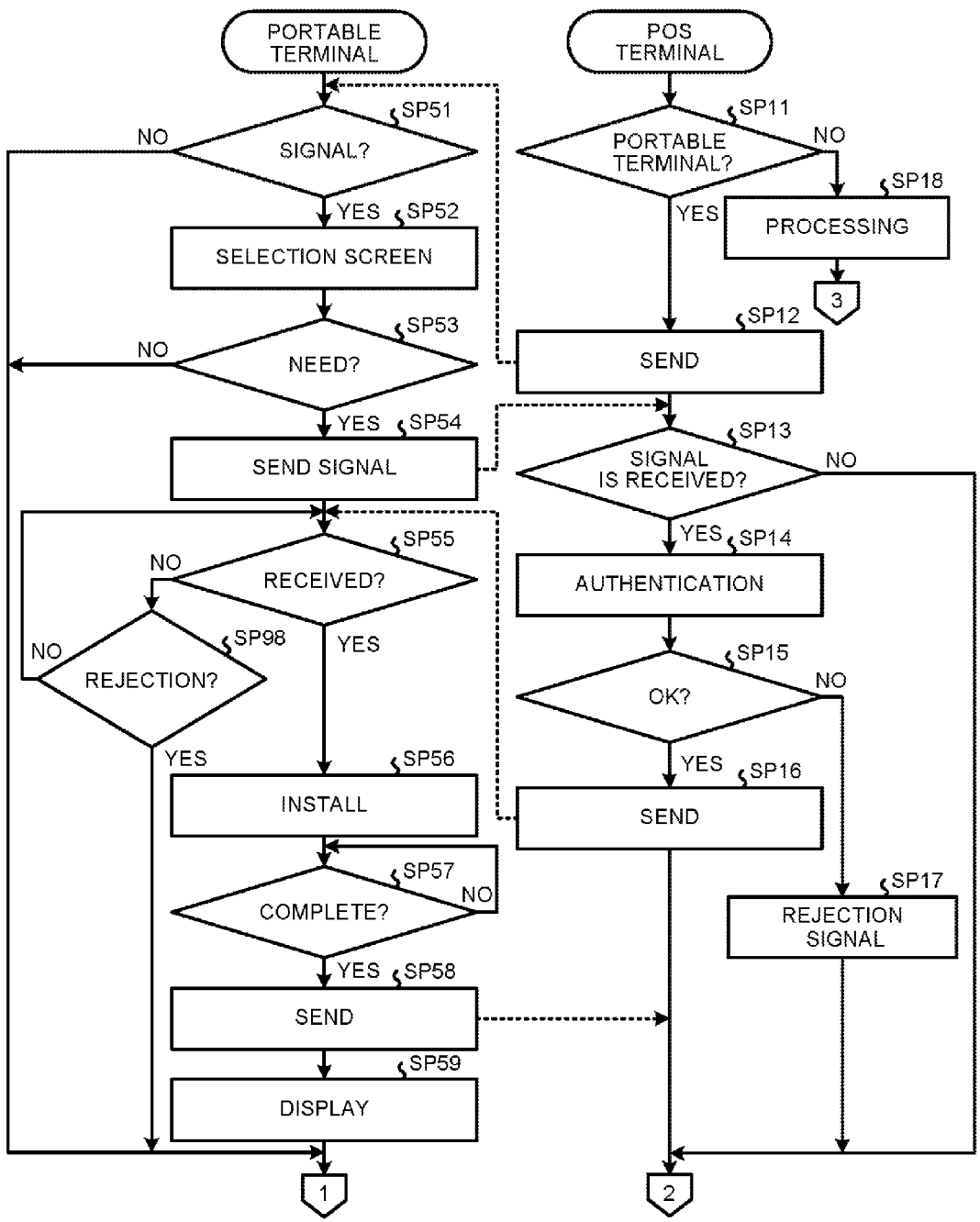
Figures 2, 7:
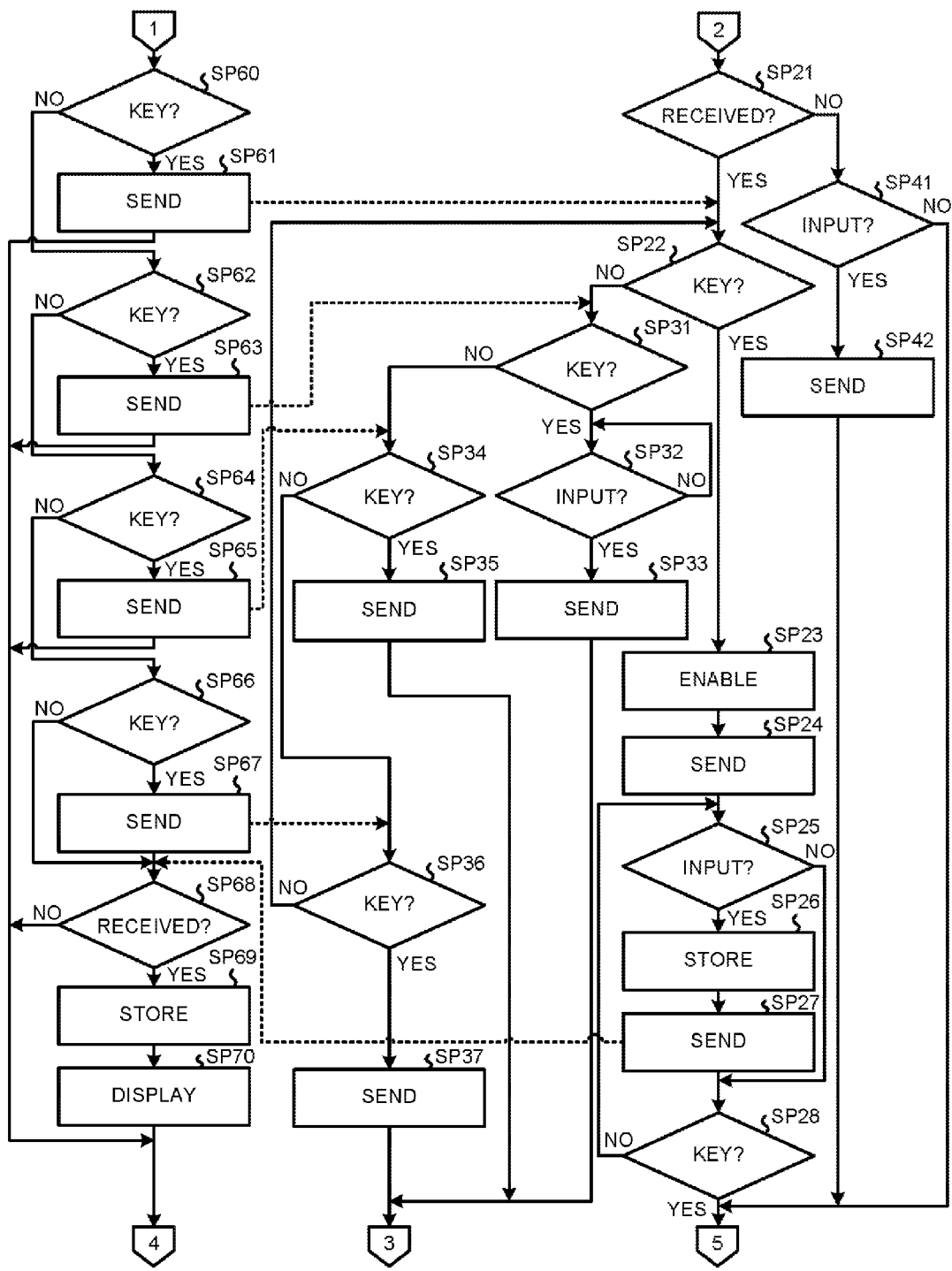
Figures 3, 7:
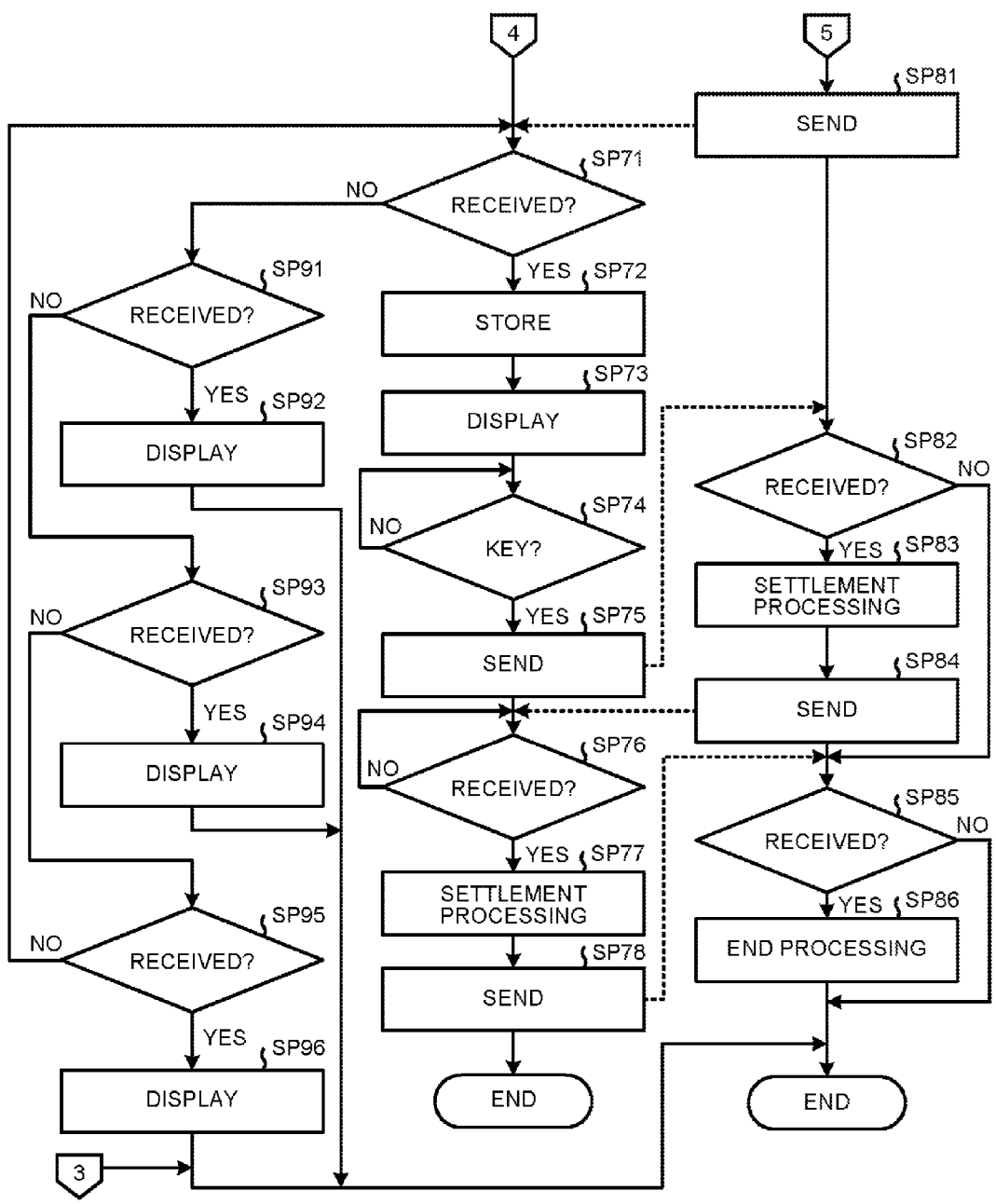

The second embodiment is the same as the first embodiment in hardware arrangement which includes the constitution shown in FIG. 1-FIG. 5 and FIG. 8, and the constitution is thereof not described herein repeatedly. The flowcharts illustrating a control processing carried out in the second embodiment are the same with that shown in FIG. 7-1 and FIG. 7-2, and are therefore not described repeatedly. The '(3)' in FIG. 7-2 is connected with '(8)' in FIG. 9, the '(4)' in FIG. 7-2 is connected with '(9)' in FIG. 9, and the '(5)' in FIG. 7-2 is connected with '(10)' in FIG. 9.

The control section 300 of the portable terminal 7 determines whether or not the settlement information based on the processing in ACT SP181 is received (ACT SP171), determines whether or not recipe information or traceability information is received (ACT SP191), determines whether or not recommended commodity information is received (ACT SP193), and determines whether or not shopping history information is received (ACT SP195).

If it is determined that the settlement information is received (YES in ACT SP171), the control section 300 stores the received commodity information and settlement information in the RAM 33 (ACT SP172). Then, the control section 300 displays the stored commodity information and settlement information on the display section 8 (ACT SP173). In the second embodiment, the receipt information, including commodity names, prices and the total amount of the purchased commodities is displayed. The customer determines whether or not to settle the content based on the displayed settlement information and operates the settlement key (not shown) displayed on the display section 8 after determining to settle the content. The control section 300 determines whether or not the settlement key is operated (ACT SP174). The control section 300 waits until the settlement key is operated (NO in ACT SP174), and if it is determined that the settlement key is operated (YES in ACT SP174), the control section 300 calculates a payment amount based on the commodity information stored in the commodity information storage section 331 (ACT SP175). That is, the control section 300 adds up commodity prices based on the commodity information stored in the commodity information storage section 331 to calculate a payment amount to be paid.

Next, the control section 300 (settlement processing unit 301) executes a settlement processing of deducting the payment amount calculated in ACT SP175 from the electronic money information stored in the memory section 34 of the portable terminal 7 and read from the RAM 33 (ACT SP176). Then, the control section 300 (settlement information sending unit 302) sends a signal indicative of the completion of the settlement processing as well as the settlement information to the POS terminal 1 (ACT SP177) when the settlement processing is ended. Then, the control section 300 ends the processing.

The control section 100 of the POS terminal 1 determines whether or not the signal indicative of the completion of the settlement processing and the settlement information are received (ACT SP182). If it is determined that the signal is received (YES in ACT SP182), the control section 100 accumulates the current sales information based on the received settlement information and updates the sales information stored in the RAM (ACT SP183). Then, the control section 100 ends the settlement processing carried out in the POS terminal 1 (ACT SP184). Next, the obtained settlement information is sent to an upper device. If it is determined that no signal indicative of the completion of the settlement processing and settlement information is received (NO in ACT SP182), the control section 100 ends the processing.

When all settlement processing is ended, the control section 100 changes the color of the light emitted from the light-emitting section 6 from yellow to blue. Additionally, the control section 100 executes an error processing and makes the light-emitting section 6 emit red light if a settlement processing is not ended smoothly, or the portable terminal 7 is taken down before a settlement processing is completed, or it is determined that another improper processing is being carried out.

Further, if the control section 300 of the portable terminal 7 determines that no commodity information or settlement information is received (NO in ACT SP171), the control section 300 determines whether or not the recipe information or traceability information sent in ACT SP33 is received (ACT SP191). If it is determined that the recipe information or traceability information is received (YES in ACT SP191), the control section 300 displays the received recipe information or traceability information on the display section 8 (ACT SP192).

If it is determined that no recipe information is received (NO in ACT SP191), the control section 300 sequentially determines whether or not the recommended commodity information sent in ACT SP35 is received (ACT SP193). If it is determined that the recommended commodity information is received (YES in ACT SP193), the control section 300 displays the received recommended commodity information on the display section 8 (ACT SP194).

If it is determined that no recommended commodity information is received (NO in ACT SP193), the control section 300 sequentially determines whether or not the shopping history information sent in ACT SP37 is received (ACT SP195). If it is determined that the shopping history information is received (YES in ACT SP195), the control section 300 displays the received shopping history information on the display section 8 (ACT SP196).

If it is determined that no shopping history information is received (NO in ACT SP195), the flow returns to ACT SP171.

In addition, according to the second embodiment, the portable terminal 7 receives commodity information and executes a settlement processing based on the received commodity information. Thus, on the basis of the first embodiment, the customer can carry out a settlement processing using the portable terminal 7. Further, by executing the settlement processing in the portable terminal 7, the workload of the POS terminal 1 can be reduced.

While the first and second embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiments described herein, only a member assigned with a customer code can executes a checkout processing by using the portable terminal 7, however, any person who can be specified in any way, even if a nonmember assigned with no customer code, can executes a checkout processing.

Further, in the embodiments described herein, in addition to a checkout processing, a commodity and information retrieval processing, a recommended commodity retrieval processing and shopping history information are also provided, which, however, are not necessary.

Further, in the embodiments described herein, a settlement processing is executed with electronic money, however, credit settlement and other settlement approaches are also applicable.

Further, in the embodiments described herein, the POS terminal 1 recognizes the portable terminal 7 when the portable terminal 7 is set on the portable terminal holding section 5, however, the portable terminal 7, as long as located in the effective function range of the NFC device 24, may not be held on the POS terminal 1.

Further, in the embodiments described herein, the commodity master 141 is arranged in the memory section 14 of the POS terminal 1, however, the commodity master 141 may also be arranged in an upper device such as a store server.

The programs executed in the commodity sales data processing apparatus of the embodiments above are recorded in a computer-readable recording medium such as a CD-ROM, a flexible disk (FD), a CD-R and a DVD (Digital Versatile Disk) in the form of installable or executable file.

Further, the programs executed in the commodity sales data processing apparatus of the present embodiment may be stored in a computer connected with a network such as Internet, and downloaded via the network. Further, the programs executed in the commodity sales data processing apparatus of the present embodiment may also be provided or distributed via a network such as the Internet.

Further, the programs executed in the commodity sales data processing apparatus of the present embodiment may also be provided by being assembled in a ROM in advance.

What is claimed is:

1. A commodity sales data processing apparatus, comprising:
    a holding section configured to detachably support a portable terminal, wherein the holding section is arranged on an upper portion of a main body of the apparatus, and the holding section supports the portable terminal in an inclined state;
    a communication section configured to execute wireless communication with the portable terminal supported by the holding section, the communication section being arranged in the holding section;
    a reader arranged on a front surface of the main body of the apparatus, the reader comprising an image sensor configured to read an image of a code symbol and recognize specification information contained in the image, the specification information specifying a commodity, wherein the reader is arranged on a front surface of the main body of the apparatus; and
    a processor configured to, in response to determining that the wireless communication with the portable terminal is established, transmit information including commodity information based on the specification information read by the reader and a total amount of the commodity through the communication section to the portable terminal supported by the holding section, the information being displayed on the portable terminal,
    wherein the processor is further configured to determine whether wireless communication with the portable terminal is established, and
        in response to determining that the wireless communication with the portable terminal is established, cause the reader to read the specification information, and
        in response to determining that the wireless communication with the portable terminal is not established, prevent the reader from reading the specification information.

2. The commodity sales data processing apparatus according to claim 1, wherein in response to receipt of a settlement instruction through the communication section from the portable terminal, the processor executes a settlement processing based on the commodity information, and wirelessly transmits settlement information resulting from the settlement processing from the communication section to the portable terminal supported by the holding section.

3. A method, comprising:
    determining, by a commodity sales data processing apparatus comprising at least one processor, whether or not wireless communication is established between a wireless communication section of the commodity sales data processing apparatus located in a holding section of the commodity sales data processing apparatus and a portable terminal detachably supported by the holding section, wherein the holding section is arranged on an upper portion of a main body of the commodity sales data processing apparatus, and the holding section supports the portable terminal in an inclined state; and in response to determining that the wireless communication is established, reading, by the commodity sales data processing apparatus, an image of a code symbol and recognizing specification information contained in the image, wherein the specification information identifies a commodity, and wirelessly transmitting, by the commodity sales data processing apparatus, information including commodity information based on the specification information and a total amount of the commodity from the wireless communication section to the portable terminal, and in response to determining that the wireless communication is not established, preventing, by the commodity sales data processing apparatus, the reading of the specification information.

4. The commodity sales data processing apparatus according to claim 1, wherein the reader is configured to recognize an object based on a feature amount of the object.

5. The commodity sales data processing apparatus of claim 1, wherein the processor is further configured to, in response to receiving a request for shopping history information from the portable terminal via the communication section, send the shopping history information to the portable terminal via the communication section.

6. The commodity sales data processing apparatus of claim 5, wherein the processor is further configured to, in response to receiving a request for recommendation information from the portable terminal via the communication section, send recommendation information identifying one or more recommended commodities based on the shopping history information to the portable terminal via the communication section.

7. The method of claim 3, further comprising:

receiving, by the wireless sales data processing apparatus, a request for shopping history information; and in response to the receiving, wirelessly transmitting, by the wireless sales data processing apparatus, the shopping history to the portable terminal.

\* \* \* \* \*